United States Patent
Yadav et al.

(10) Patent No.: US 11,900,490 B1
(45) Date of Patent: Feb. 13, 2024

(54) MOBILE APP, WITH AUGMENTED REALITY, FOR CHECKING ORDINANCE COMPLIANCE FOR NEW AND EXISTING BUILDING STRUCTURES

(71) Applicant: Morgan Stanley Services Group Inc., New York, NY (US)

(72) Inventors: Shashi Yadav, Edison, NJ (US); Rishi Bhatnagar, East Brunswick, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 17/941,561

(22) Filed: Sep. 9, 2022

(51) Int. Cl.
*G06Q 50/16* (2012.01)
*G06T 7/60* (2017.01)
*G06V 20/10* (2022.01)

(52) U.S. Cl.
CPC ............ *G06Q 50/163* (2013.01); *G06T 7/60* (2013.01); *G06V 20/176* (2022.01); *G06T 2207/30184* (2013.01)

(58) Field of Classification Search
CPC ............. G06Q 50/163; G06T 7/60; G06T 2207/30184; G06V 20/176
See application file for complete search history.

(56) References Cited

U.S. PATENT DOCUMENTS

| | | | |
|---|---|---|---|
| 10,964,110 B2 * | 3/2021 | Chandrashekarappa | G06F 3/011 |
| 2005/0027588 A1 * | 2/2005 | Current | G06Q 30/02 705/314 |
| 2014/0168277 A1 * | 6/2014 | Ashley | G09G 5/14 345/672 |
| 2017/0091998 A1 * | 3/2017 | Piccolo, III | G06Q 90/00 |
| 2019/0057169 A1 | 2/2019 | Santarone et al. | |
| 2019/0128771 A1 | 5/2019 | Santarone et al. | |
| 2019/0340819 A1 * | 11/2019 | Chandrashekarappa | G06F 9/451 |
| 2019/0347783 A1 * | 11/2019 | Salgian | G06T 7/0004 |
| 2019/0392088 A1 | 12/2019 | Duff et al. | |
| 2020/0151833 A1 | 5/2020 | Bellaish et al. | |
| 2020/0224525 A1 * | 7/2020 | Parmeshwar | E21B 47/007 |
| 2020/0412926 A1 | 12/2020 | Zass et al. | |
| 2021/0004948 A1 | 1/2021 | Zass et al. | |
| 2021/0064774 A1 | 3/2021 | Collart | |

(Continued)

OTHER PUBLICATIONS

"Computer vision applications in construction: Current state, opportunities, and challenges" (Year: 2021).*

(Continued)

*Primary Examiner* — Dennis W Ruhl
(74) *Attorney, Agent, or Firm* — K&L Gates LLP (57) ABSTRACT

Software application for a digital display device determines, in real time, whether structures/objects of real property comply with applicable ordinances and permits. Mobile device app determines the street address for the property being inspected. User of the mobile device captures visual media of internal or external structure/object on the property. App detects the object in the visual media using computer vision-based image recognition. App calls back-end computer system to look up in real time applicable ordinances for the structure/object and/or whether there is an appropriate permit(s) for the structure/object. App generates and displays on the mobile device augmented visual media that visually indicates whether the detected structure/object is compliant or not.

21 Claims, 10 Drawing Sheets

(56) References Cited

U.S. PATENT DOCUMENTS

2021/0064877 A1    3/2021  Ramasamy et al.
2021/0073928 A1    3/2021  Zass et al.
2021/0082151 A1    3/2021  Zass et al.
2021/0334544 A1*  10/2021  Minsky ................... G06F 18/29
2022/0107977 A1*   4/2022  Marthouse ............... G06N 3/08

OTHER PUBLICATIONS

"How computer vision can help improve safety compliance", Naveen Joshi; (Year: 2020).*
"The 5 Best Computer Vision Applications for Construction" ; Liz Oz (Year: 2022).*
"Leveraging Augmented Reality for Highway Construction" (FHWA Nov. 2020) (Year: 2020).*

* cited by examiner

MOBILE APP, WITH AUGMENTED REALITY, FOR CHECKING ORDINANCE COMPLIANCE FOR NEW AND EXISTING BUILDING STRUCTURES

BACKGROUND

While buying a house today, buyers do not have an easy way to find out if the property they are buying has all the permits and meets all ordinances for any construction done, such as for a swimming pool, fencing, a deck, etc. The house buying process is further complicated by different townships and municipalities having different maintaining records for such ordinances. Consequently, there is no one way for a house buyer to check conveniently and early in the house buying process if all properties that the buyer is considering are compliant with the applicable regulations and ordinances. While ordinance checking often comes up later in the house buying process, such as during appraisal, by then it usually is too late and the buyers are too emotionally or financially vested and/or fatigued to go through another search. The prospective buyers usually end up negotiating the cost of a new permit or meeting the ordinance.

SUMMARY

In an general aspect, embodiments of the present invention are directed to a software application ("app") for a digital display device (such as a smartphone, tablet computer, smart glasses, virtual reality/augmented reality ("VR/AR") headset, etc.) to be used, for example, by a house buyer to determine, in real time, whether structures or other objects of a house (or other building or real property) comply with applicable ordinances and had required permits. The mobile device app determines the street address for the property being inspected. This can be done, for example, with a GPS sensor of the mobile device or by inputting the location (e.g., street address) of the house into the app. A user of the mobile device can then capture visual media (e.g., video or image) of an internal or external structure or object in the house or on the property (e.g., a fence, a wall, a swimming pool, a deck, a room, an outbuilding, etc.); the app can detect the object in the visual media using computer vision-based image recognition; and then the app can call a back-end computer system to look up in real time in a database the applicable ordinances for the object and/or whether there is an appropriate permit(s) for the object. The app then generates and displays on the mobile device augmented visual media by, for example, merging, in real time, the visual media captured by the mobile device with a virtual compliance indicator for the object, where the virtual compliance indicator visually indicates whether the detected object is compliant or not, for example.

A method, according to embodiments of the present invention can comprise storing, in a computer database of a back-end computer system, building ordinance data for a municipality (or other applicable local government agency) and permit data for real properties in the municipality. The method also comprises determining, by a mobile device that is in communication with the back-end computer system via an electronic data network, a physical address for a subject property in the municipality where a user of the mobile device is using the mobile app to assess compliance of one or more objects at the subject property. The method also comprises, after determining the physical address for the subject property, in real time as the user of the mobile device moves around the subject property, by the mobile device: (i) detecting, using computer vision, a first object at the subject property in a field of view of a camera system of the mobile device; (ii) determining a compliance status of the first object, where the compliance status comprises an assessment of whether the first object is compliant with ordinances and permitting requirements of the municipality, and where the compliance status is determined based in part on the ordinance and permit data stored in the database of the back-end computer system; and displaying on a display of the mobile device augmented visual media, where the augmented visual media comprises visual media captured by the camera system of the mobile device and a first virtual indicator for the first object, where the first virtual indicator indicates the compliance status of the first object. In that connection, the mobile device comprises a camera system that comprises one or more camera sensors, an wireless communication interface for communicating with the back-end computer system, and software, such as an mobile application for "app," for generating and displaying on the mobile device, the augmented visual media, Such an app could provide a great benefit to a person interested in buying a house, for example. The user could get instant feedback on whether various structures and objects at the property meet applicable ordinance and permit requirements and, if not, what might be required to make the object/structure compliant. These and other benefits of embodiments of the present invention will be apparent from the description that follows.

FIGURES

Various embodiments of the present invention are described herein by way of example in connection with the following figures.

DESCRIPTION

Figure 1:
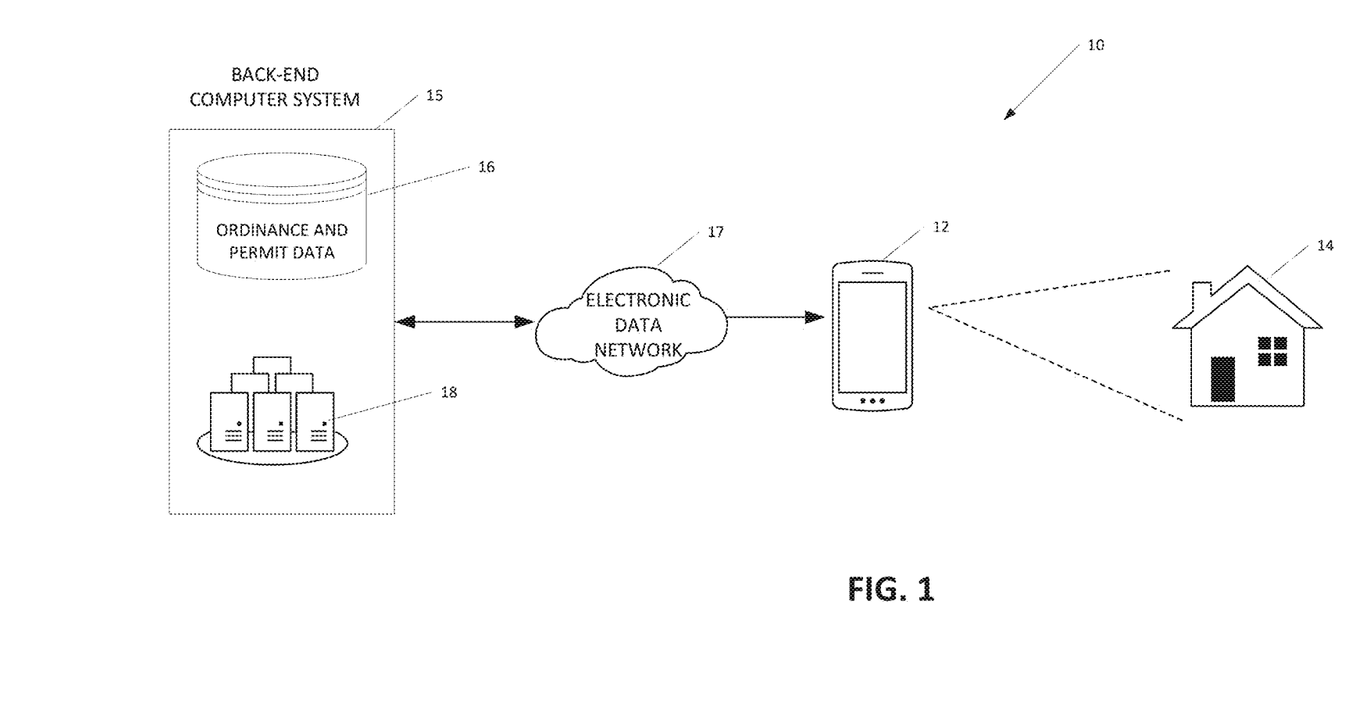
FIG. 1 is a diagram of a system, according to various embodiments of the present invention, which includes a mobile device for generating AR visual media show the ordinance and/or permit compliance status of an object(s) in or on real property, such as a house.

FIG. 1 is a diagram of a system 10 that includes a mobile device 12 for taking, with a camera system of the mobile device 12, images and/or video (hereinafter, "visual media") of objects or structures in, on, or otherwise associated with real property 14. The objects and structures could be any object or structure for which there is an applicable building or code ordinance in the municipality of the real property, or for which a permit(s) is required to construct or erect, etc., the object or structure. Using the mobile device's camera system and appropriate software, the mobile device 12 can augment the visual media captured by the camera system to, in real time, display whether the object/structure is compliant with applicable ordinance and permitting requirements. In that connection, the object or structure could be internal or external. The object/structure could be, for example, an exterior fence, an interior or exterior wall, a fireplace, an addition (e.g., a room) to the house, a swimming pool (inside or outside), roofing, an outbuilding, a deck, etc. The real property 14 could be a residential dwelling that a user of the mobile device 12 is considering buying or renting. The real-time ordinance checking feature could also be used for other types of real property 14, such as commercial property or land, for example.

Data about the applicable ordinances and permits are stored in a computer database 15 of a back-end computer system 16. The mobile device 12 communicates with the back-end computer system 16 via an electronic data network 17, which may include a LAN, a WAN, the Internet, and/or a cellular data network (e.g., 4G LTE, 5G, etc.). The back-end computer system 16 may further include one or more servers 18 for receiving requests from the mobile device 12 via the network 17, fetching relevant data from the database 16, and transmitting responses to the mobile device via the network 17. In that connection, the server(s) 18 may include a mobile application server and/or a database server. The server(s) 18 could comprise a cloud server(s), for example.

Figure 2:
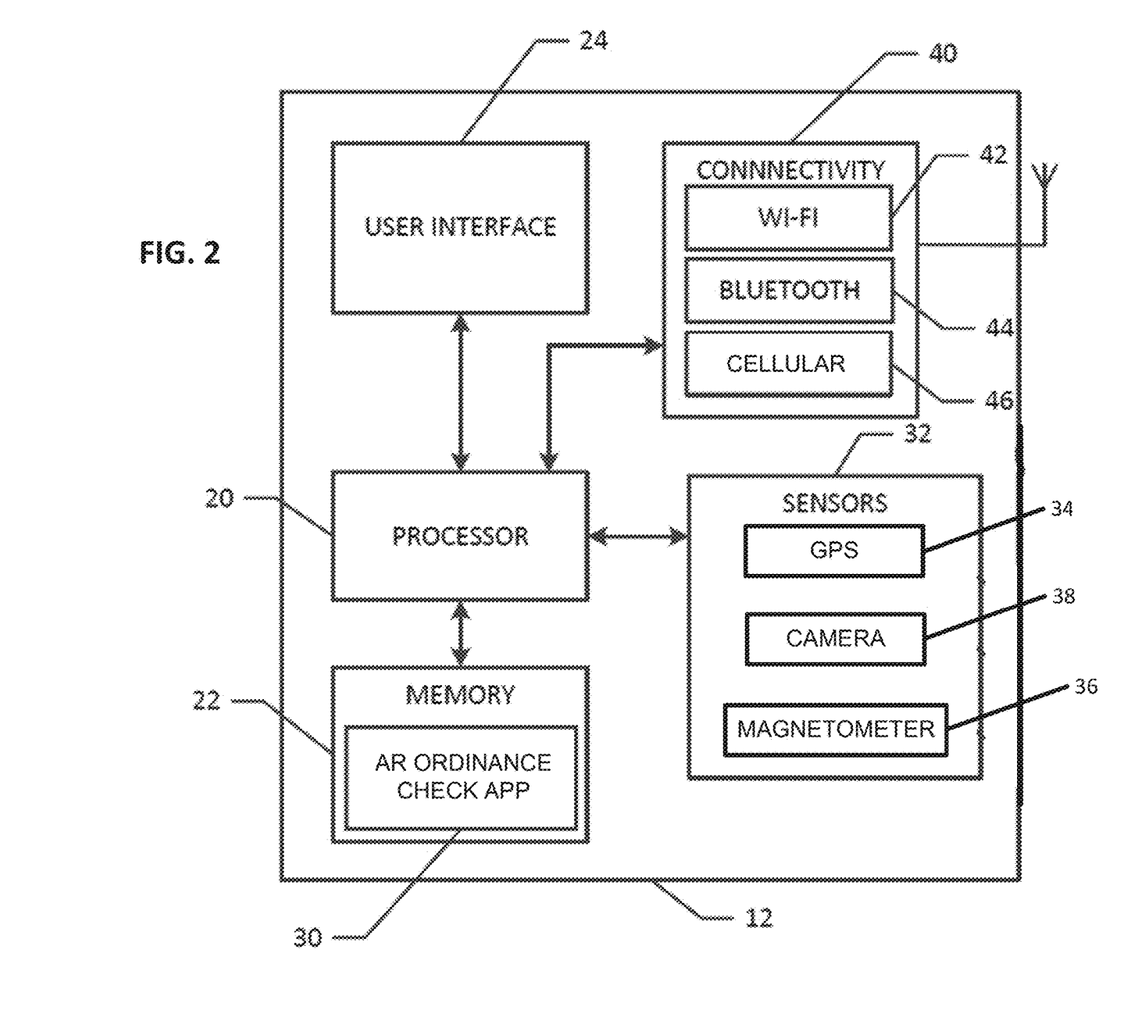
FIG. 2 is a block diagram of the mobile device of the system of FIG. 1 according to various embodiments of the present invention.

Before describing in more detail how the ordinance checking is performed, exemplary aspects, components and features of the mobile device 12 are described. FIG. 2 is a block diagram of the mobile device 12 of FIG. 1 according to various embodiments. The mobile device 12 may be a smartphone, a tablet computer, a wearable computer (such as smart glasses), a VR or AR headset, or any other suitable mobile computing device. FIG. 2 illustrates some of the components that in at least one example may be employed by or included as part of the mobile device 12. The mobile device 12 includes, for example, at least one processor 20, at least one memory unit 22, and a user interface 24. The memory 22 may include internal Random Access Memory (RAM), Read Only Memory (ROM) and/or flash memory, as well as optional removable storage. The RAM may be, for example, LPDDR2 DRAM; the ROM may include one or more memory chips; the flash memory may include a SSD or emmc flash memory; and the optional removable storage may include a form of microSD card. One or more of these memory units may store an AR ordinance check app 30, which is a software application that when executed by the processor 20 causes the processor 20 to identify objects in the visual media captured by the mobile device's camera system, communicate with the back-end computer system 15 to look up applicable ordinances and/or permits for the identified object/structure, and display the AR virtual indicator of the compliance status for the object/structure, according to techniques described herein. The user interface 24 may include a display (such as a LCD, LED, OLED display), a touch interface, and/or haptic systems that are common in today's mobile devices for allowing users to view and input information via the mobile device's display.

The mobile device 12 may also include various sensors 32 that are in communication with the processor 20, including a GPS receiver (or chip) 34 for calculating (in an assisted GPS process, for example) and/or receiving GPS position coordinates for the mobile device 12. The mobile device 12 may also include a camera system 38 that captures digital images and/or video of the structures or objects of the real property 14 for which compliance with applicable ordinances and permitting is checked as described herein. The camera system 38 preferably comprises at least two cameras with a known, fixed geometric relationship. The known, fixed geometric relationship facilitates measurement of objects in the visual media captured by the camera system 38. The cameras of the camera system 38 may comprise, for example, CCD or CMOS sensors. The cameras also preferably are high resolution cameras, such as cameras with 8 megapixel or greater sensors, because greater resolution facilitates the camera vision aspects of the app 30, such as object detection and object measurement. The mobile device 12 may also include a magnetometer 36 and/or other inertial sensors, such as accelerometers and gyroscopes to help determine an orientation or bearing of the mobile device 12.

As shown in FIG. 1, the illustrated mobile device 12 also includes a wireless connectivity module 40, which may include any or all of a WiFi (IEEE 802.11) module 42, a Bluetooth module 44, a cellular network interface (e.g., 4G LTE or 5G) 46, and/or any other suitable wireless interface. The mobile device 12 connects to the back-end computer system 15 via the network 17 wirelessly via one of these interfaces. For the sake of simplicity, other conventional components of the mobile device 12 are not shown in FIG. 1, such as the power management system, the battery, level translators, the audio system, codecs, USB ports, etc.

With reference to FIG. 1, prior to use of the app 30, ordinance and permit data for one or more local government agencies (e.g., municipalities, cities, town, townships, etc.) are assimilated and stored electronically in the database 16. The ordinance and permit data may be collected initially in whatever form it exists in the municipality's records, such as electronic or paper records. The requirements of the building ordinances for each municipality can be extracted by the back-end computer system 15 and stored in the database 16 using appropriate technologies, such as computer vision, OCR, natural language processing (NPL), image recognition and/or machine learning, and/or manual/human review if necessary to read electronic maps and documents. OCR and NPL can be used, for example, to processing text or language to digital metadata. Computer vision can be used by the back-end computer system 15 to generate (e.g., draw) a virtual image of a structure according to the applicable ordinances and permits for the structure. The app 30 can then overlay that digital image in images captured by the mobile device for comparison of the dimensions. The back-end computer system 15 can convert to digital format, for storing in the database 18, any non-digital documents and maps so that the information in the documents, maps, etc. can be extracted by the back-end computer system 15. Once the information is digitized (if necessary) and extracted, the ordinances can then be assimilated into rules for different objects: set back distances and heights for fences and retaining walls, whether fences are required for in-ground swimming pools, sizes for detached outbuildings, whether building permits are required for certain objects, etc. The permit data for dwellings in the municipality can also be extracted and recorded in a similar manner. The permit data can comprise the property to which it applies, the object or structure that is permitted, the size of the object/structure, the date of the permit, the party that requested the permit, etc.

Figure 3:
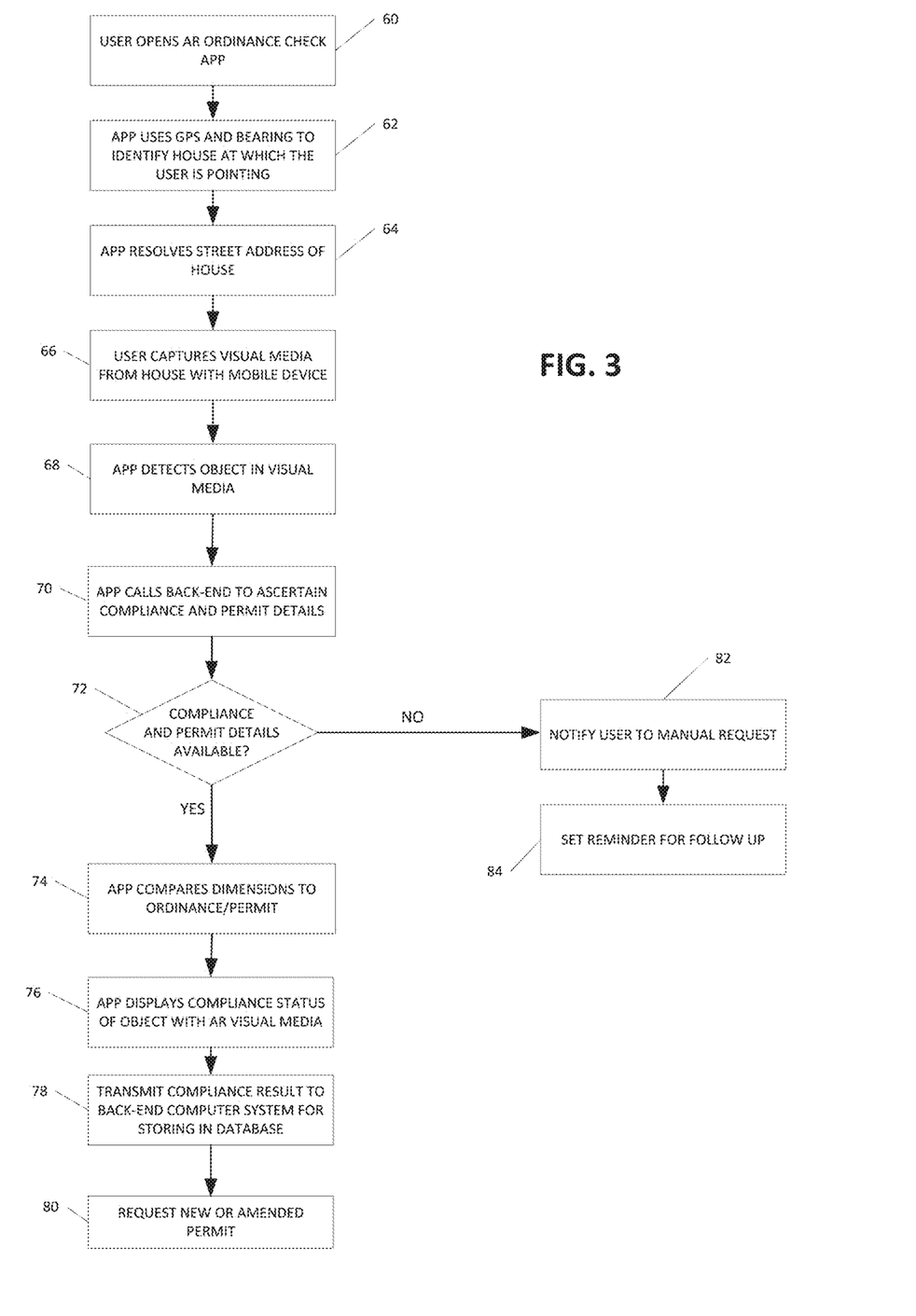
FIG. 3 is a flow chart of a process performed by the system of FIG. 1 according to various embodiments of the present invention.

FIG. 3 is a flow chart of a process that can be performed with the mobile device 12 with the AR ordinance check app 30 according to various embodiments of the present invention. For purposes of this explanation, it is assumed that the real property 14 is a house and the user of the mobile device 12 uses the app 30 to determine the status of objects and structures of the house 14, such as when the user of the mobile device 12 tours the house because the user is potentially interested in buying the house. The process starts at block 60, where the user opens the AR ordinance check app 30 on his/her mobile device 12 at the location of the house 14. At step 62, the user points the mobile device's camera system 38 at the house 14 and the AR ordinance check app 30 identifies the geo-location of the house 14 based on, for example, the GPS and bearing data for the mobile device 12 from the GPS 34 and magnetometer 36. For example, based on the GPS coordinates, the app 30 could determine that the user/mobile device 14 is on, for example, Main Street in the town of Anytown, half-way between two cross streets, and from the mobile device's bearing data the app could determine that the user is pointing the mobile device north. Based on that position and orientation information, the app 30 can determine, at step 64, the street address for the house 14 is, for example, 123 Main Street, Anytown. In various embodiments, the app 30 can determine the address for the house based on the GPS coordinates for the house by contacting a commercial geo-location service, such as Google Maps, using, for example, an API (e.g., Geolocation API). In other embodiments, the back-end server(s) 18 may include or contact the geolocation service to determine the street address of the house 14 based on the GPS and bearing data from the mobile device 12.

If the address of the house cannot be resolved in such a manner, the app 30 may have an interface that allows the user to enter the street address for the house 14. Alternatively, the app 30 might, for example, interface with another real-estate app on the mobile device that displays on the mobile device homes for sale or rent. The user could click on a particular house from the real-estate app and retrieve, via an API with the real-estate app, the street address for the house that the user clicked on.

At step 66, the user of the mobile device 12 captures visual media of objects/structures in or about or around the house 14. As the mobile device's camera system 38 is capturing the visual media, the app 30, at step 68, employs object detection technology to recognize semantic objects/structures of certain classes in the visual media. The classes can be objects/structures that have applicable ordinances and/or that require building permits (e.g., walls, fences, pools, etc.). The app 30 can employ, for example, region-based convolutional neural networks to detect the objects in the visual media. The app 30 can also estimate the dimensions of the detected object based on the sensor sizes and focal lengths of the cameras of the camera system 38, as well as the fixed geometric relationship between the cameras. In embodiments where the camera system 38 only includes one camera system, an object of a known dimension could be placed next to the object of interest so that the dimension of the object of interest could be determined from the determined based on the size of the known object in the visual media captured by the mobile device 12.

Note that in various embodiments, the mobile device 12 does not need to record the visual media in a recording format, such as 3GPP, MPEG-4 AVC, etc. for video or JPEG, GIF, HEIC, etc. for images, in order to detect the objects and measure their size. The mobile device could instead capture the visual media by displaying the view from the camera system on the user interface 24 in a live capture/viewing mode without permanently recording it. In various embodiments, the back-end server(s) 18 can perform the object recognition and/or classifications of step 68. In such embodiments, the mobile device 12 could transmit the visual media captured and recorded by the mobile device 12 to the back-end computer system 15 via the network 17.

At step 70, the app 30 calls the back-end computer system 15 for the compliance and permit details for the detected device. For example, the app 30 may transmit data about the semantic class of the object detected to the back-end computer system 15. The back-end server 18 can query the database 16 for compliance regulations about the object class and for permits for the house 14 related to the object. For example, if the detected object is an in-ground swimming pool, the back-end server 18 can query the database 16 for the municipality's ordinances for in-ground swimming pools; and the back-end server 18 can query the database 16 for permits at the house address for in-ground swimming pools. If there are no applicable ordinances for the detected object, the back-end computer system 15 can send a message to the app 30 to the effect that there are no applicable ordinances. If there is an applicable ordinance for the detected object, the back-end computer system 15 can query the database 16 for permit data for the detected object. If there is a permit in the database 16, the back-end computer system 15 can extract the permitted dimensions from the permit to send back to the app 30. As mentioned previously, the back-end computer system 15 can generate a virtual image of the object according to the dimensions and/or drawings in the relevant permit(s).

If at step 72 dimension details (including the virtual image if available) for the detected object are available, the back-end computer system 15 transmits them to the app 30 and the app 30, at step 74, compares its computed dimensions for the object (computed at step 68) to the applicable dimensional requirements of the permit(s) for the object. For example, the app 30 can determine whether the size and/or position of the object satisfy the size and/or position requirements of the applicable ordinances and permits.

At step 76, the app 30 can generate and display augmented visual media that displays the results of the compliance analysis from step 74 to the user of the mobile device 12 on the display/user interface 24 of the mobile device 12. The app 30 can display the results of the compliance analysis by augmenting the visual media of the object captured by the mobile device 12 in real time with a virtual indicator of the compliance status for the object as the user of the mobile device 12 is capturing the visual media from the house 12. As part of this step, the app 30 can overlay the virtual image on the object (received at step 72) in the images captured by the camera system of the mobile device 12. That way, the user of the app 30 can compare visually the virtual image to the actual object (as represented in the images captured by the mobile device 12) to assess the similarities and differences between what it permitted and what the property actually includes. In various embodiments, the app 30 can built using, for example, Google ARCore and/or Apple ARKit software development kits. The app 30 can add the virtual object indicators and/or the virtual image to the detected object in the captured visual media by tracking the detected object in captured visual media and rendering the virtual indicator and/or virtual image for the object, as the case may be, so that the virtual indicator and/or virtual image tracks with its associated object in the captured media as the associated object changes position in the captured media.

Figure 4A:
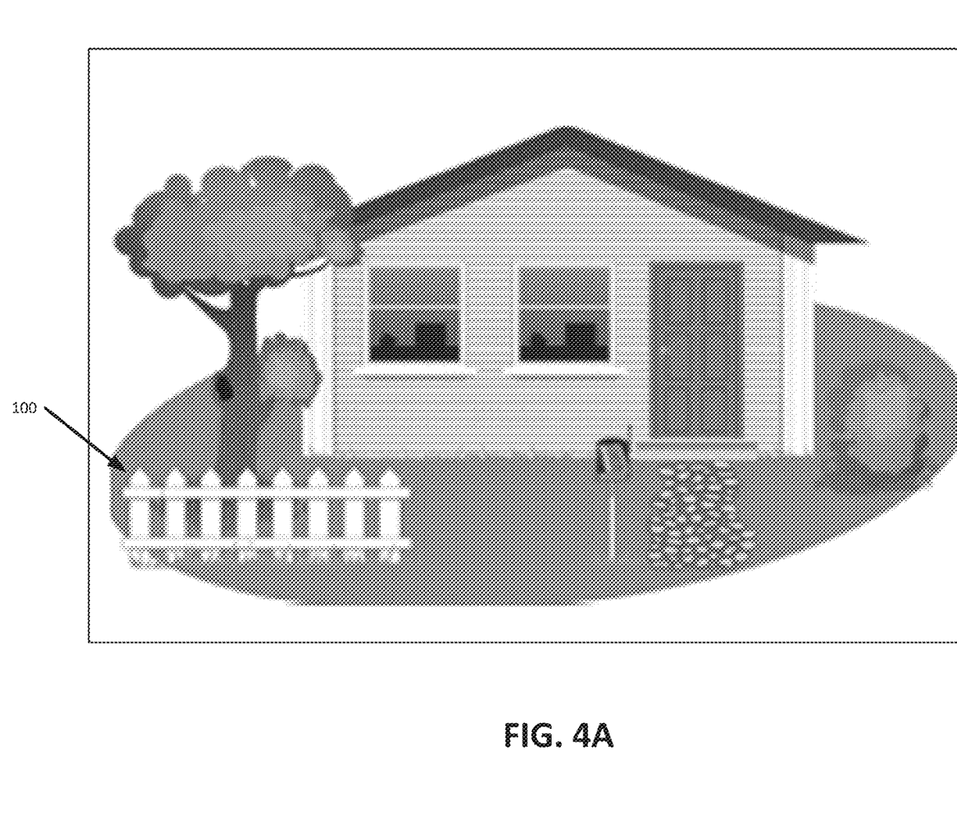
FIGS. 4A-D and 5A-C are example still shots of example AR visual media according to various embodiments of the present invention.

Examples of AR virtual compliance indicators for detected objects are illustrated in connection with FIGS. 4A-C and FIGS. 5A-C. In the example of FIG. 4A, the user captured visual media of the front of the house 14 including a fence 100. In the example of FIG. 5A, the user captured visual media of the back of the house 14 including an in-ground swimming pool 102. If the fence 100 and/or swimming pool 102 are compliant, the app 30 can augment the visual media to include a virtual indicator of the compliance determination. For example, the app 30 can merge, augment and/or fuse the visual media captured by the camera system 38 with the virtual indicator such that the visual indicator is added, overlaid or superimposed as a banner, badge, tag or other visual, virtual compliance indicator 104 that shows whether the object is compliant (see FIGS. 4B and 5B) or non-compliant (see FIGS. 4C and 5C), as the case may be. In the examples of FIGS. 4B-C and 5B-5C, the virtual compliance indicators 104 state whether the detected object is "compliant" or "non-compliant" as the case may be. In other embodiments, different text could be used to convey the status of the compliance check (e.g., "Good" and "Bad," etc.). Additionally and/or in lieu of text, the virtual compliances indicator 104 could use visual enhancements, such as color coding, blinking features, varying intensity, etc. For example, compliant objects could be marked with green AR tags (which may or may not include text as well) and non-compliant objects could be marked with red AR tags. There may also be further categories of compliance status. For example, a positive (e.g., "green") indicator could indicate that a permit exists for the structure and structure meets the ordinance and permit requirements; a negative (or "red") indicator could indicate there is no permit for the structure; and a waring (or "amber") indicator could indicate that a permit for the structure/object may exist, but the structure/object doe not meet the ordinance and/or permit requirements. The virtual indicators 104 can merged or fused with the visual media captured by the camera system 38 such that the virtual indicator 104 moves with the object as the object changes its position in the field of view (FOV) of the camera system 38 as the scene at the house 14 to which the camera system 38 points changes over time.

In various embodiments, the virtual compliance indicators 104 could be interactive. The mobile device user could click on or otherwise activate, via the user interface 24, a virtual compliance indicator 104 in the AR visual media, to see more information about the object. For example, clicking or otherwise activating an indicator may display the semantic class for the object, the app's estimated dimensions for the object and, if there is a permit, the date of the permit and/or other data from the permit. For a non-compliant object, information about why the object is non-compliant might be displayed (e.g., no permit when one is required, too big, inappropriate set back, etc.). An example of this in is shown in FIG. 4D. In this example, the user activated the "non-compliant" indicator 104 in FIG. 4C, resulting in the example explanation shown in FIG. 4D that provides more information to the user about why the detected object is non-compliant.

Figure 4B:
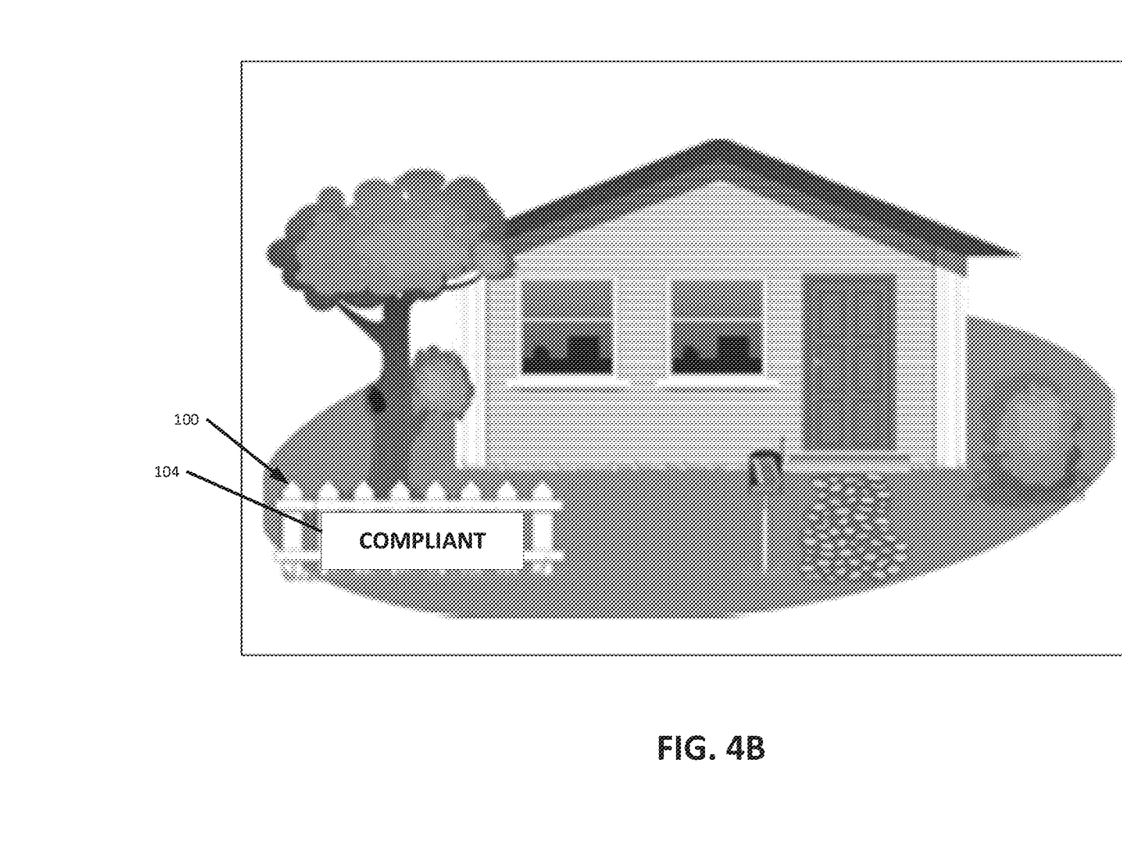
Figure 4C:
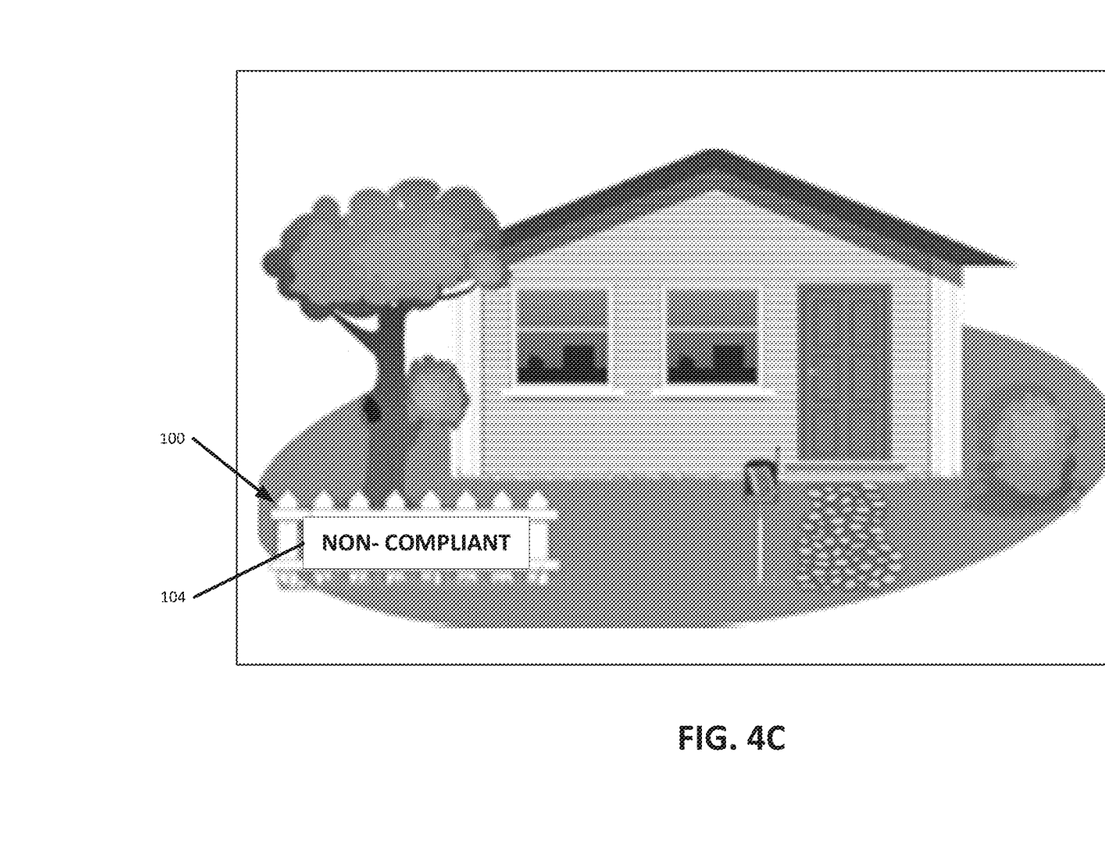
Figure 4D:
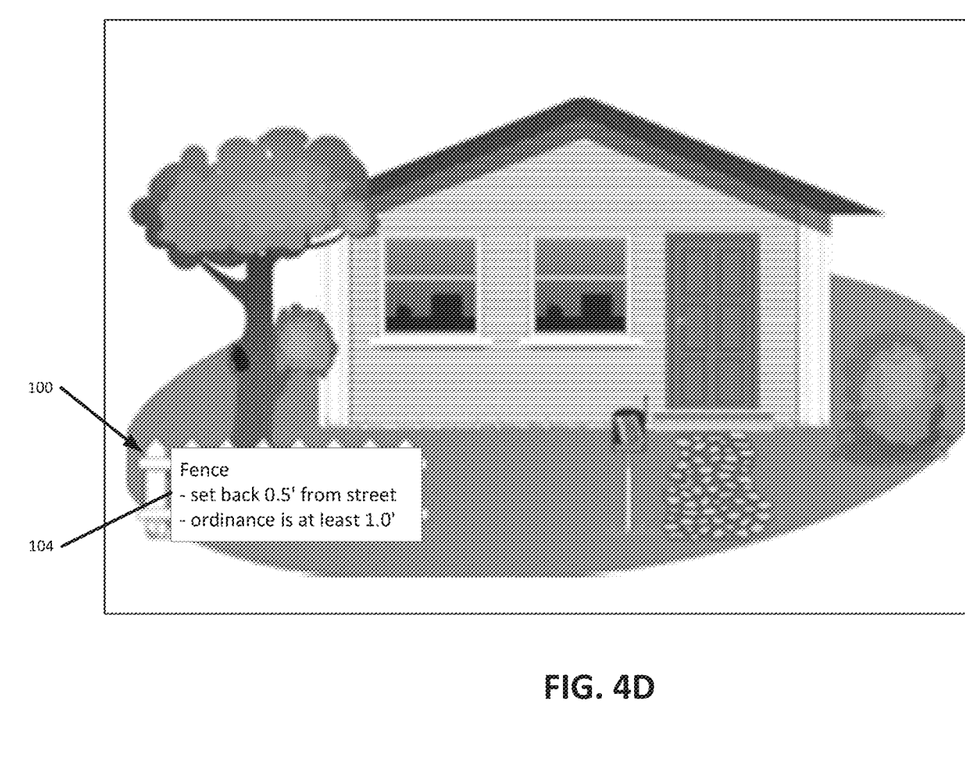
Figure 5A:
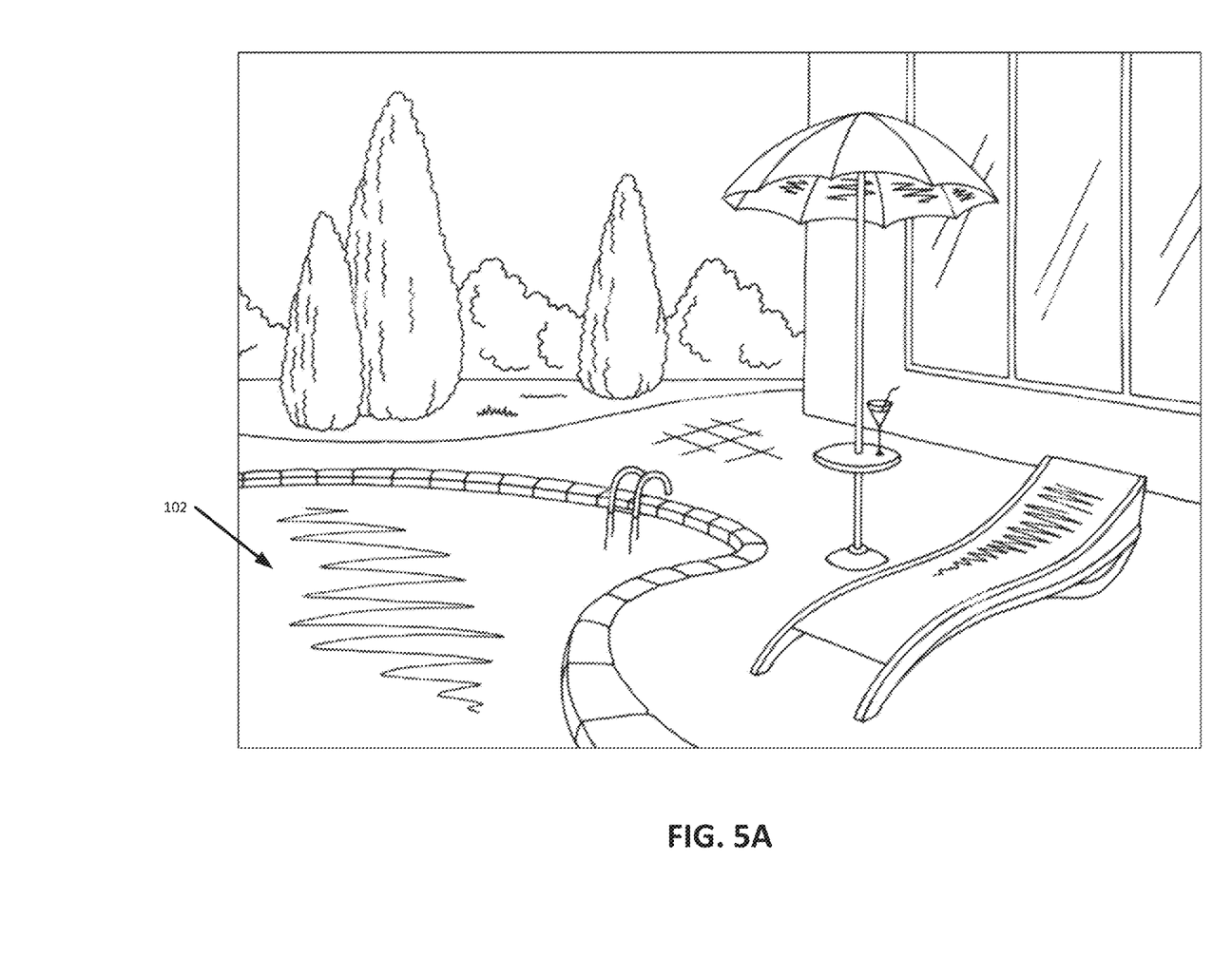
Figure 5B:
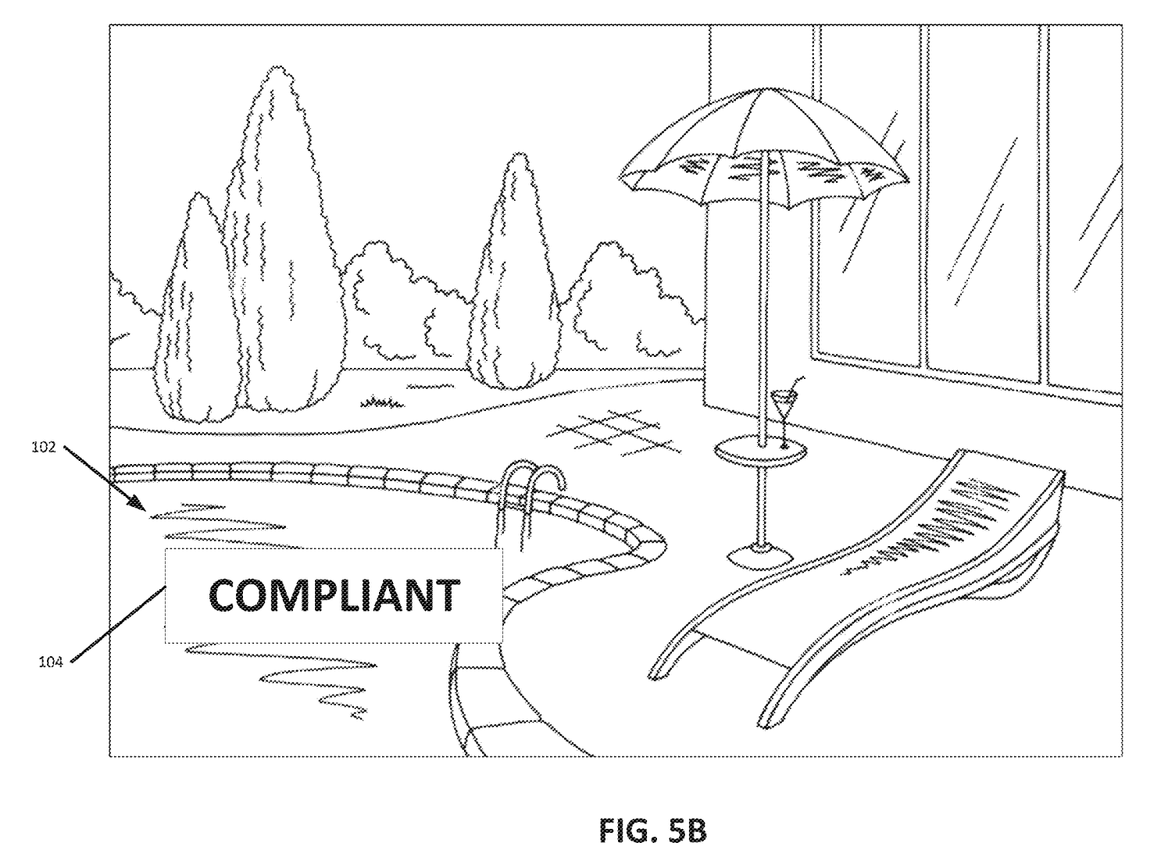
Figure 5C:
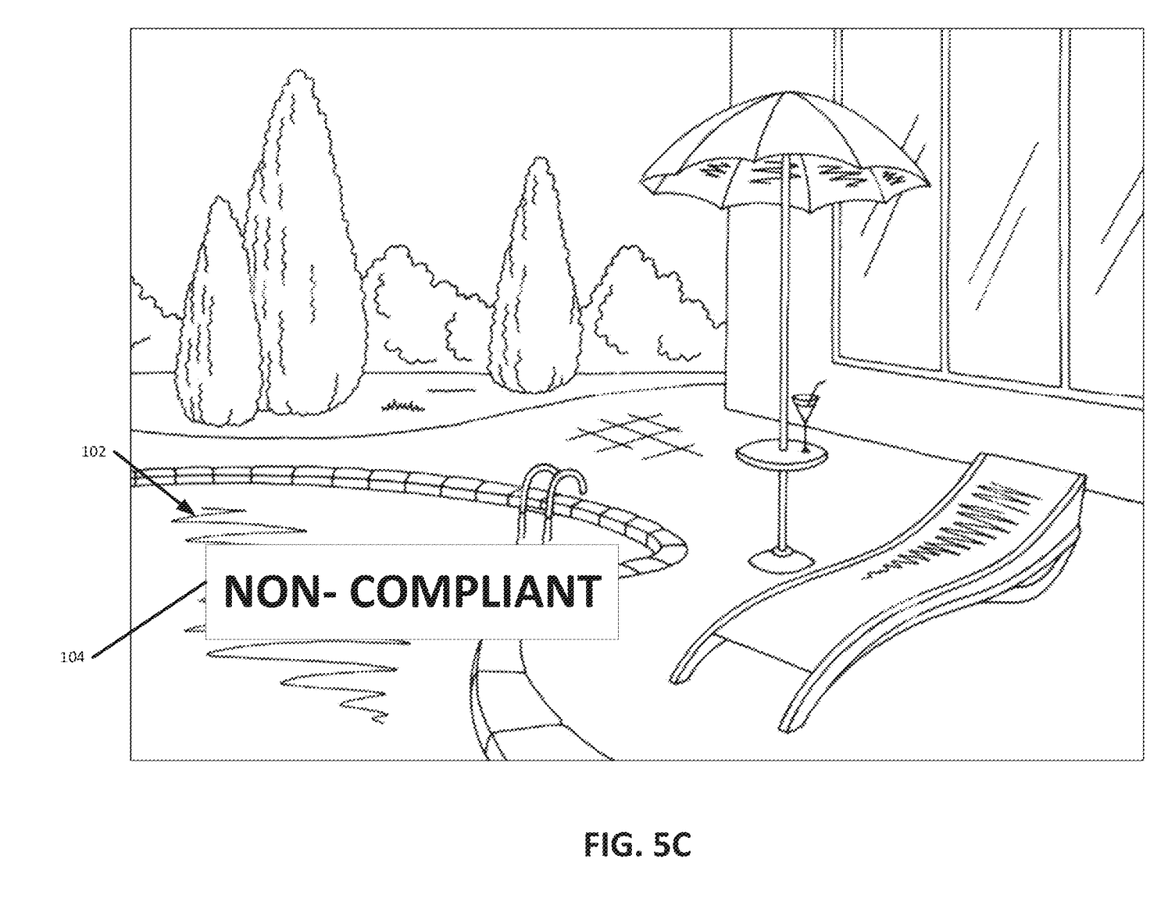

In the examples of FIGS. 4B-4C and 5B-5C, only one object is tagged with an AR virtual compliance indicator 104 (the fence 100 in FIGS. 4B-4C and the pool 102 in FIGS. 5B-5C). In various embodiments, multiple detected objects in the visual media can be tagged with an appropriate AR indicator 104. As such, for example, as the mobile device user moves around the house 14 capturing video of the house 14, the video displayed on the mobile device 12 can be augmented, in real time, by the app 30 with the appropriate virtual compliance indicator 104 for each object recognized in the visual media for which the compliance analysis was performed. That way, the user can see the compliance status of the various objects in real time via the app 30 as the user moves around the house 14. If the detected object is momentarily not in the visual media presently being captured by the mobile device 12 when the app 30 finalizes the compliance/non-compliance determination for the object, the app 30 can add the virtual compliance indicator 104 to the object the next time it appears in the live visual media captured and displayed by the mobile device 12. For example, the user could scan the right side of the house 14, then pan to the light side, and when the user pans back to the right side, the compliance status of the detected objects on the right side of the house can be displayed. As mentioned previously, indicators 104 move with their associated objects in the visual media as the FOV of the camera system 38 changes while capturing the visual media.

Returning back to FIG. 3, the app 30 may transmit via the network 17 the status of the compliance determination at step 78 back to the back-end computer system 15 for storage, with a time stamp, in the database 16. That way, the next time a user of the app 30 (which could be a different user with a different mobile device with a different version of the app 30) surveys the house 14, in response to the app 30 calling the back-end system 15 at step 70, the back-end server 18 can merely look up in the database 16 the compliance status of the detected object. If the prior, stored compliance determination was too long ago, i.e., has become stale (e.g., more that a threshold number of days or months old), the back-end system 15 may ignore the prior determination and instead determine compliance/non-compliance as described above.

As an optional step, if the detected object requires a permit, but there is no permit and/or the existing permit for the detected object is insufficient (e.g., the dimensions of the detected object are outside the dimensions of the permit), the app 30 can initiate at step 80 a request for a new or amended permit, as the case may be, for the detected object to the municipality's electronic permitting interface.

Some municipalities have real-time, web-based data interfaces. As such, if compliance and/or permit details about the detected object at the house are not available, the back-end computer system 15 can, at step 72, query, such as via an API, the real-time data interface for the municipality for ordinance and/or permit data. If the municipality has information about the house, the information can be transmitted to the app 30 so that the app 30 can determine compliance as described above.

If the municipality does not have a real-time interface, or if the municipality has a real-time interface but nonetheless data about the house are not available, the process advances to step 82, where the app 30 can provide a visual notice to the user that a manual request to the municipality should be made. Also, at step 84, the app 30 can remind the user after a certain time period to follow up on the manual request to the municipality.

In the embodiments described above, the app 30 compared the measured dimensions of the detected object to requirements of the applicable ordinances and/or permits at step 74. In other embodiments, the app 30 could transmits the data for determining the dimensions of the detected object to the back-end computer system 15, which could then make the compliance determination for the detected object, and thereafter transmit the determination back to the app 30 so that the app 30 could display the determination at step 76 as described above.

In addition the above-described features, the app 30 could also generate a list of permits for the property. For example, the back-end computer system 15 could retrieve from the database 16 all permits that have been issued for the property. The back-end computer system 15 could transmit this data to the app 30, which displays the permits for the property. The user can then determine if there are an "unused" permits. As an example, if building of a shed was recently permitted for the house, but there is no shed, the user could infer that a shed could be constructed on the property without needing additional permitting.

In one general aspect, therefore, the present invention is directed to systems and methods for checking, in real time, the compliance status of structures and object of a real property, such as a house. A system according to embodiments of the present invention comprises a back-end computer system and a mobile device. The a back-end computer system comprises a computer database that stores building ordinance data for a government agency and stores permit data for real properties in the government agency. The mobile device is for communicating with the back-end computer system via an electronic data network. The mobile device comprises: a display; a camera system that comprises one or more cameras; a processor; and a memory in communication with the processor. The memory stores a mobile app. The mobile app comprises software that when executed by the processor causes the processor to determine a physical address for a subject property in the government agency where a user of the mobile device is using the mobile app to assess compliance of one or more objects at the subject property. The mobile app also comprises software that when executed by the processor causes the processor to, after determining the physical address for the subject property, in real time as the user of the mobile device moves around the subject property: detect, using computer vision, a first object at the subject property in a field of view of the camera system; and determine a compliance status of the first object. The compliance status comprises an assessment of whether the first object is compliant with ordinances and permitting requirements of the government agency, and is determined based in part on the ordinance and permit data stored in the database of the back-end computer system. The mobile app also comprises software that when executed by the processor causes the processor to display, on the display of the mobile device, augmented visual media, where the augmented visual media comprises visual media captured by the camera system of the mobile device and a first virtual indicator for the first object, where the first virtual indicator indicates the compliance status of the first object.

A method according to embodiments of the present invention comprises the step of storing, in a computer database of a back-end computer system, building ordinance data for a government agency and permit data for real properties in the government agency. The method also comprises the step of determining, by a mobile device that is in communication with the back-end computer system via an electronic data network, a physical address for a subject property in the government agency where a user of the mobile device is using the mobile app to assess compliance of one or more objects at the subject property. The method also comprises, after determining the physical address for the subject property, in real time as the user of the mobile device moves around the subject property, by the mobile device: detecting, using computer vision, a first object at the subject property in a field of view of a camera system of the mobile device; determining a compliance status of the first object, where the compliance status comprises an assessment of whether the first object is compliant with ordinances and permitting requirements of the government agency, and where the compliance status is determined based in part on the ordinance and permit data stored in the database of the back-end computer system; and displaying, on a display of the mobile device, augmented visual media, where the augmented visual media comprises visual media captured by the camera system of the mobile device and a first virtual indicator for the first object, where the first virtual indicator indicates the compliance status of the first object.

In various implementations, the mobile app comprises software that when executed by the processor causes the processor to determine the compliance status of the first object by determining whether there is an applicable ordinance for the first object and, in response to a determination that there is an applicable ordinance: determining estimated dimensions of the first object based on images from the camera system and known specifications of the camera system; and comparing the estimated dimensions to a dimensional requirement of permit data for the first object stored in the database. The mobile app can comprise software that when executed by the processor causes the processor to compare the estimated dimensions to the ordinance and permit data stored in the database by: making a call to the back-end computer system for ordinance and permit data relevant to the first object; and comparing the ordinance and permit data transmitted to the mobile device from the back-end computer system in response to the call.

In various implementations, the camera system comprises at least first and second camera sensors having a fixed geometric relationship. Also, the mobile app comprises software that when executed by the processor causes the processor to determine the estimated dimensions of the first object based on the fixed geometric relationship between the first and second camera sensors.

In various implementations, the first virtual indicator is interactive such that, upon activation by the user of the first virtual indicator in the augmented visual media, the first virtual indicator in the augmented virtual media updates to provide additional information about the compliance status of the first object.

In various implementations, the first object comprises a building structure selected from the group consisting of an internal building structure and an external building structure. For example, the building structure could be a wall, a fence, a swimming pool, an outbuilding, an addition to a dwelling, or a deck.

In various implementations, the mobile app comprises software that when executed by the processor further causes the processor to, in real time as the user of the mobile device moves around the subject property: detect, using computer vision, a second object at the subject property in the field of view of the camera system; determine a compliance status of the second object, where the compliance status comprises an assessment of whether the second object is compliant with the ordinances and permitting requirements of the government agency; and further augment the augmented visual media displayed on the display of the mobile device to further include a second virtual indicator for the second object, where the second virtual indicator indicates the compliance status of the second object.

In various implementations, the mobile app comprises software that when executed by the processor further causes the processor to determine the physical address for the subject property based on GPS data for the mobile device and inertial sensor data from inertial sensors of the mobile device.

In various implementations, the mobile device comprises a smartphone, a tablet computer, a wearable computer, a pair of smart glasses, a VR headset or an AR headset, for example.

In various implementations, the mobile app comprises software that when executed by the processor further causes the processor to, upon a determination that the first object is not compliant with the ordinances and permitting requirements, generate a permit request for the first object.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A system comprising:
  a back-end computer system that comprises a computer database, wherein the computer database stores building ordinance data for a government agency and stores permit data for real properties in the government agency; and
  a mobile device for communicating with the back-end computer system via an electronic data network, wherein the mobile device comprises:
    a display;
    a camera system that comprises one or more cameras;
    a GPS receiver;
    one or more inertial sensors;
    a processor; and
    a memory in communication with the processor, wherein the memory stores a mobile app, the mobile app comprising software that when executed by the processor causes the processor to:
      determine a physical address for a subject property based on a location and orientation of the mobile device, wherein the location and orientation of the mobile device is determined based on, at least in part, inputs from the GPS receiver and inputs from the one or more inertial sensors; and
      after determining the physical address for the subject property, in real time as a user of the mobile device moves around the subject property:
        detect, using computer vision, a first object at the subject property in a field of view of the camera system;
        determine, based on visual media captured by the camera system, a compliance status of the first object, wherein the compliance status comprises an assessment of whether the first object is compliant with ordinances and permitting requirements of the government agency, and wherein the assessment comprises, when a permit for the first object is required, a permit compliance assessment that comprises (a) whether a permit for the first object at the subject property exists in the computer database and (b) upon a determination that the permit for the first object at the subject property exists in the computer database, a comparison of (i) dimensions and position of the first object at the subject property, based on an image of the first object captured by the mobile device, to (ii) dimensions and position for the first object according to the permit; and
        display, on the display of the mobile device, augmented reality, wherein the augmented reality comprises real time visual media captured by the camera system of the mobile device and a first virtual indicator for the first object within the field of view of the camera system, wherein the first virtual indicator is overlaid on the first object in the display, and wherein the first virtual indicator indicates the compliance status of the first object.

2. The system of claim 1, wherein the mobile app comprises software that when executed by the processor causes the processor to determine the compliance status of the first object by, at least in part:
  determining estimated dimensions of the first object based on images from the camera system and known specifications of the camera system; and
  comparing the estimated dimensions to a dimensional requirement of permit data for the first object stored in the computer database.

3. The system of claim 2, wherein the mobile app comprises software that when executed by the processor causes the processor to compare the estimated dimensions to the ordinances and permit data stored in the computer database by:
  making a call to the back-end computer system for the ordinances and permit data relevant to the first object; and
  comparing the ordinances and permit data transmitted to the mobile device from the back-end computer system in response to the call.

4. The system of claim 2, wherein:
  the camera system comprises at least first and second camera sensors having a fixed geometric relationship; and
  the mobile app comprises software that when executed by the processor causes the processor to determine the estimated dimensions of the first object based on the fixed geometric relationship between the first and second camera sensors.

5. The system of claim 2, wherein the first virtual indicator is interactive such that, upon activation by the user of the first virtual indicator in the augmented reality, the first virtual indicator in the augmented reality updates to provide additional information about the compliance status of the first object.

6. The system of claim 1, wherein the first object comprises a building structure selected from the group consisting of an internal building structure and an external building structure.

7. The system of claim 6, wherein the building structure is selected from the group consisting of a wall, a fence, a swimming pool, an outbuilding, an addition to a dwelling, and a deck.

8. The system of claim 1, wherein the mobile app comprises software that when executed by the processor further causes the processor to, in real time as the user of the mobile device moves around the subject property:
  detect, using computer vision, a second object at the subject property in the field of view of the camera system;
  determine a compliance status of the second object, wherein the compliance status comprises an assessment of whether the second object is compliant with the ordinances and permitting requirements of the government agency; and further augment the augmented reality displayed on the display of the mobile device to further include a second virtual indicator for the second object, wherein the second virtual indicator indicates the compliance status of the second object.

9. The system of claim 1, wherein the mobile device comprises a mobile device selected from the group consisting of a smartphone, a tablet computer, a wearable computer, a pair of smart glasses, a VR headset and an AR headset.

10. The system of claim 1, wherein the mobile app comprises software that when executed by the processor further causes the processor to, upon a determination that the first object is not compliant with the permitting requirements, generate an electronic permit request for the first object to be sent to the government agency.

11. A method comprising:

storing, in a computer database of a back-end computer system, building ordinance data for a government agency and permit data for real properties in the government agency; and determining, by a mobile device that is in communication with the back-end computer system via an electronic data network, a physical address for a subject property, wherein the mobile device comprises a GPS receiver, one or more inertial sensors, a camera system that comprises one or more cameras, and a display, wherein determining the physical address for the subject property comprises determining the physical address for the subject property based on a location and an orientation of the mobile device, wherein the location and orientation of the mobile device are determined based on, at least in part, inputs from the GPS receiver and inputs from the one or more inertial sensors; and after determining the physical address for the subject property, in real time as a user of the handheld mobile device moves around the subject property, by the mobile device:

detecting, using computer vision, a first object at the subject property in a field of view of a camera system of the mobile device;

determining, based on visual media captured by the camera system, a compliance status of the first object, wherein the compliance status comprises an assessment of whether the first object is compliant with ordinances and permitting requirements of the government agency, and wherein the assessment comprises, when a permit for the first object is required, a permit compliance assessment that comprises (a) whether a permit for the first object at the subject property exists in the computer database and (b) upon a determination that the permit for the first object at the subject property exists in the computer database, a comparison of (i) dimensions and position of the first object at the subject property, based on an image of the first object captured by the handheld mobile device, to (ii) dimensions and position for the first object according to the permit; and displaying, on the display of the mobile device, augmented reality, wherein the augmented reality comprises real time visual media captured by the camera system of the handheld mobile device and a first virtual indicator for the first object within the field of view of the camera system, wherein the first virtual indicator is overlaid on the first object in the display, and wherein the first virtual indicator indicates the compliance status of the first object.

12. The method of claim 11, wherein determining the compliance status of the first object comprises, at least in part:

determining estimated dimensions of the first object based on specifications of the camera system; and comparing the estimated dimensions to a dimensional requirement of permit data for the first object stored in the computer database.

13. The method of claim 12, wherein comparing the estimated dimensions to the ordinances and permit data stored in the computer database comprises:

making a call to the back-end computer system for the ordinances and permit data relevant to the first object; and comparing the ordinances and permit data transmitted to the mobile device from the back-end computer system in response to the call.

14. The method of claim 12, wherein:

the camera system comprises at least first and second camera sensors having a fixed geometric relationship; and determining the estimated dimensions of the first object comprises determining the estimated dimensions of the first object based on the fixed geometric relationship between the first and second camera sensors.

15. The method of claim 12, wherein:

the first virtual indicator is interactive; and upon activation by the user of the first virtual indicator in the augmented reality, updating the first virtual indicator in the augmented reality to provide additional information about the compliance status of the first object.

16. The method of claim 11, wherein the first object comprises an internal or external building structure.

17. The method of claim 11, further comprising, by the mobile device:

detecting, using computer vision, a second object at the subject property in the field of view of the camera system;

determining a compliance status of the second object, wherein the compliance status comprises an assessment of whether the second object is compliant with the ordinances and permitting requirements of the government agency; and further augmenting the augmented reality displayed on the display of the mobile device to further include a second virtual indicator for the second object, wherein the second virtual indicator indicates the compliance status of the second object.

18. The method of claim 11, further comprising, by the mobile device, upon a determination that the first object is not compliant with the permitting requirements, generating an electronic permit request for the first object for sending to the government agency.

19. The method of claim 11, wherein determining the compliance status of the first object further comprises making, by the back-end computer system, an API call to a real-time data interface of the government agency for permit data for the subject property.

20. The method of claim 11, wherein storing the building ordinance data and permit data in the computer database of the back-end computer system comprises extracting and processing, by the back-end computer system, digital information from ordinances and permits of the government agency.

21. The method of claim 20, wherein extracting and processing the digital information from the ordinances and permits of the government agency comprises digitizing, by the back-end computer system, the ordinances and permits of the government agency.

\* \* \* \* \*